June 11, 1940. J. W. ALLEN 2,204,463
INDICATING MECHANISM
Original Filed March 2, 1935 2 Sheets-Sheet 1
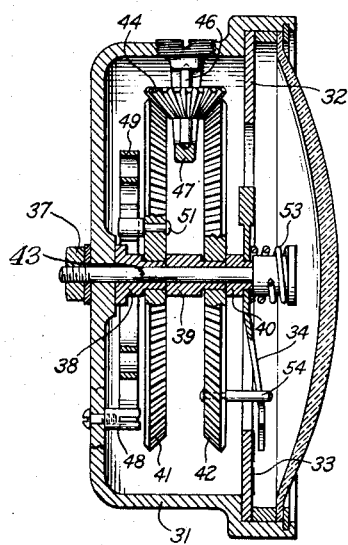
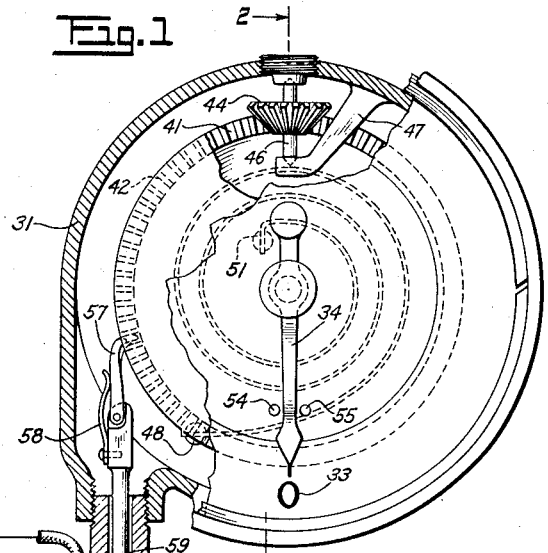
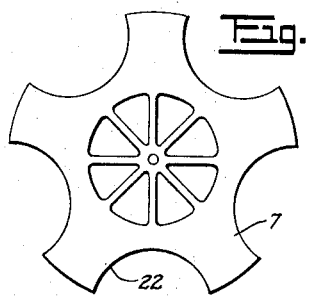
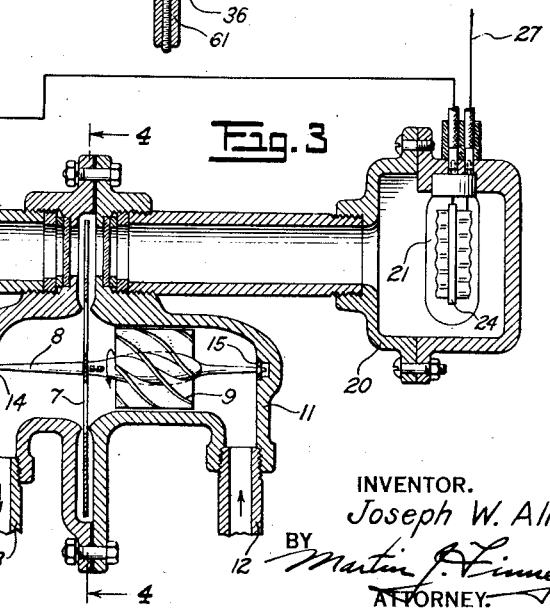
INVENTOR.
Joseph W. Allen
BY
ATTORNEY.

Patented June 11, 1940

2,204,463

UNITED STATES PATENT OFFICE 2,204,463

INDICATING MECHANISM

Joseph W. Allen, East Orange, N. J., assignor to Eclipse Aviation Corporation, East Orange, N. J., a corporation of New Jersey Application March 2, 1935, Serial No. 9,101
Renewed May 17, 1938

3 Claims. (Cl. 264—21)

This invention relates to indicators, and an object thereof is to provide improvements in means for indicating the pressure, velocity, rate of flow, or other characteristic of fluids as the conditions to which they are subjected undergo variations.

In the accompanying drawings the invention is shown in a form suitable for indicating the rate of flow of a fluid flowing through a closed conduit; but it is to be understood that the drawings are merely for the purpose of illustration and description and do not constitute a definition of the limits of the invention, reference being had to the appended claims for such a definition of limits.

In the drawings:

Fig. 1 is a partly sectional representation of the measuring means employed in the preferred embodiment of the invention, and the electrical energizing means for said parts;

Fig. 2 is a longitudinal sectional view of the impulse receiving, or measuring unit;

Fig. 3 is a longitudinal sectional view of the impulse sending unit;

Fig. 4 is a face view of the light interrupting means along the line 4—4 of Fig. 3.

Figure 5:
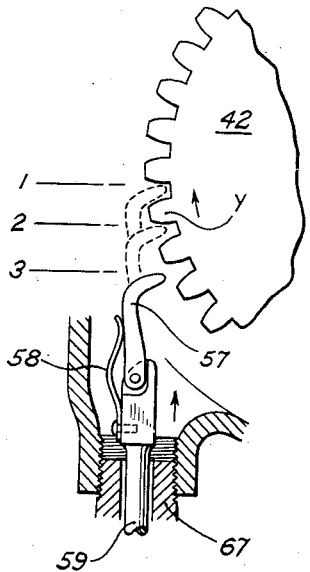
Fig. 5 is a diagrammatic view of the relationship between the pawl and gear mechanism when the former is at its lowest position.

The primary impulse sending mechanism is shown as including a light source 6 which illuminates an apertured and recessed disk 7 secured to the shaft 8 of a relatively light impeller assembly 9 rotatable in a housing 11 through which a fluid to be measured is adapted to flow, the housing having inlet and outlet passages 12 and 13, respectively, and bearings 14 and 15 in which the ends of the impeller shaft 8 are received.

The disk 7 is of a diameter sufficient to bring the outer portions thereof into the path of the light beam passing through tube 18 which connects the lamp casing 19 with the casing 20 which encloses a photo-electric cell 21. Due to the recesses 22 cut in the disk 7 at regular intervals the light beam is intermittently effective to excite the cell 21, the anode 24 of which is connected, through a manually controlled switch 25, to the positive terminal of a battery 26, while the cathode connects, through a lead 27, with the winding of a solenoid 28 constituting part of the impulse receiving unit.

The impulse receiving unit also includes a glass covered casing 31 having a stationary annular scale 32 including characters 33 and a pointer 34, the extent of movement of the pointer being proportional to the frequency of the impulses sent into the solenoid 28 from the cell 21, and therefore an indication of the rapidity of rotation of disk 7, and hence of the rate of flow through housing 11. Each current impulse in solenoid 28 sets up a magnetic field acting upon core 36 to raise it and thus impart movement to pointer 34 by the means now to be described.

The case 31 has a shaft 43 held to the case by a nut 37. Spacers 38, 39, and 40 are in turn held together by shaft 43. The spacers 38 and 39 have recesses adapted to receive bevel gears 41 and 42, respectively, loosely mounted thereon, and coacting with an idler pinion 44, which pinion is mounted on shaft 46 held in position by arm 47 fastened to housing 31.

A pin 48 fastened to housing 31 supports one end of a spiral spring 49. The other end of spiral spring 49 is fastened to pin 51, which pin is riveted to gear 41. Pointer 34 is loosely fitted to spacer 40. Spring 53 holds pointer 34 against the shoulder on spacer 40. The pointer 34 being in balance will hold its position because of friction at the shoulder on spacer 40.

On gear 42 are located two pins 54, 55 between which the pointer 34 may move before striking either pin.

A pawl 57 is positioned to engage teeth of gear 42. A spring 58 holds pawl 57 against the gear teeth when the pawl is moving upward but permits the pawl to move out of engagement with the teeth when descending. The pawl 57 is pivoted freely to a plunger 59 which receives a nut 61 at its lower end and passes through core 36 of the solenoid 28. Also within the core 36 is a spring 63 acting upon the plunger 59 to cause it to move with the core 36, the latter being supported in position by nut 61, and normally held against said nut by the action of a second spring 64 which abuts the stationary pole piece 66 formed integral with the housing 67.

The moving system having been set in motion continues in motion until energy is stored in spring 49, whereupon spring 49 moves the gears in the reverse directions.

Spring 64 retracts pawl 57 as soon as the circuit is interrupted, allowing pawl 57 to disengage the gear teeth.

It will be seen therefore that due to energy stored in spring 49 the movement of gears 41 and 42 will be a function of the kinetic energy of the gears and the tension of spring 49. If we now operate solenoid 28 at a given frequency the gears will be moved around until they move forward through a short distance and then back a short distance so that the pointer 34 is stationary, the movement of the gears being too small to allow pins 54, 55 to produce any further movement of the pointer.

At a greater frequency the gears are moved around further until another fixed condition is reached.

Figure 6:
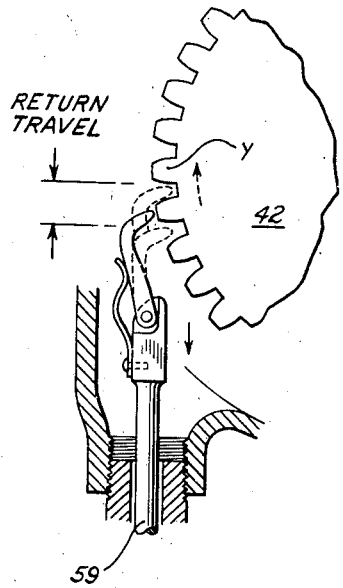
Fig. 6 is a diagrammatic view of the pawl and gear mechanism when the former is in a position intermediate that of Fig. 1 on the one hand and that of Fig. 5 on the other.

The action of the gear moving means may best be understood by a study of Figs. 5 and 6. Referring first to Fig. 5 the pawl 57 as shown in full lines therein, is in the non-engaging position corresponding to the lowest point of the stroke, while the dash lines indicate two higher points in the stroke. Fig. 6 shows the action when the rate of flow is high enough to produce a high frequency action of the pawl, tending to shorten its stroke. Of course, before such high frequency is obtained the pointer 34 has moved around the dial to the position corresponding to full tensioning of the spring 49. When this condition of maximum flow has been obtained, there will be no further advance, for thereafter when gear 42 is released by pawl 57, it will be driven backward, by tensioned spring 49, the one-tooth advancement that had just previously been imparted thereto, with no resultant advancement produced by the impulse energization of magnet 28. This however is only true after the spring has been rather completely wound up; it is not true during the early stage of rotation of the pointer 34, for in the early stage the spring 49 is not tensioned sufficiently to equal the force of the repeated thrusts of pawl 57 as it moves at relatively rapid frequency. Hence pawl 57 is more effective to turn the gear 42—during this early stage—while spring 49 is relatively ineffective as an opposing force. Gradually the preponderance of power vanishes, and a condition of balanced forces results.

The foregoing covers two conditions. Now there is a third condition—the condition of stoppage of flow.

When stoppage of flow occurs, the rate of energization of magnet 28 falls off and it soon stops altogether. When it stops the pawl is held in its lowest (non-engaged) position (by spring 64). Spring 49 is now unopposed by the pawl, and is free to spin the gear 42 all the way back to the zero position—but only because pawl 57 is now dead. So long as pawl 57 remained active, no such complete return could be effected.

Because of the use of the two interconnected gears 41, 42 the inertia of each gear balances any tendency in the other gear to move with respect to the housing 31. As assembled the movement of one gear is in one direction while that of the other is in the opposite direction.

The invention is susceptible of various changes in its form, proportions and minor details of construction and the right is herein reserved to make such changes as properly fall within the scope of the appended claims.

What is claimed is:

1. In combination with a series of characters, an index element movable along said series of characters, reciprocable variable stroke means for driving said index element forward, and means for imparting energizing impulses to said reciprocable means; the stroke of said reciprocable means being shortened as the energizing impulses become more frequent.

2. In combination with a series of characters, an index element movable along said series of characters, reciprocable variable stroke means for driving said index element forward, means for imparting energizing impulses to said reciprocable means; the stroke of said reciprocable means being shortened as the energizing impulses become more frequent; and means urging said index element backward in opposition to the force of said reciprocable variable stroke means.

3. In combination with a series of characters, an index element movable along said series of characters, reciprocable variable stroke means for driving said index element forward, means for imparting energizing impulses to said reciprocable means; the stroke of said reciprocable means being shortened as the energizing impulses become more frequent; means urging said index element backward in opposition to the force of said reciprocable variable stroke means, and means for holding said index element stationary after movement of said index element in either direction from one position to a new position.

JOSEPH W. ALLEN.